(12) United States Patent
Mawle et al.

(10) Patent No.: US 7,887,707 B2
(45) Date of Patent: Feb. 15, 2011

(54) REGENERATION OF WATER TREATMENT SUBSTRATES

(75) Inventors: Peter James Mawle, Guildford (GB); Michael John Waite, Bisley (GB)

(73) Assignee: The BOC Group Limited, Surrey (GB)

( * ) Notice: Subject to any disclaimer, the term of this patent is extended or adjusted under 35 U.S.C. 154(b) by 432 days.

(21) Appl. No.: 11/886,642

(22) PCT Filed: Mar. 17, 2006

(86) PCT No.: PCT/GB2006/001002

§ 371 (c)(1),
(2), (4) Date: Oct. 7, 2008

(87) PCT Pub. No.: WO2006/097762

PCT Pub. Date: Sep. 21, 2006

(65) Prior Publication Data

US 2009/0071906 A1 Mar. 19, 2009

(30) Foreign Application Priority Data

Mar. 18, 2005 (GB) .................................. 0505689.0

(51) Int. Cl.
*B01J 49/00* (2006.01)

(52) U.S. Cl. ..................... 210/665; 210/676; 210/677

(58) Field of Classification Search ................. 210/665, 210/676, 677

See application file for complete search history.

(56) References Cited

FOREIGN PATENT DOCUMENTS

| EP | 0 226 667 A | 7/1987 |
|---|---|---|
| GB | 1 432 020 | 4/1976 |
| GB | 2 348 209 A | 9/2000 |
| NL | 8 403 004 A | 5/1986 |
| WO | WO 03/074430 A | 9/2003 |

*Primary Examiner*—Chester T Barry
(74) *Attorney, Agent, or Firm*—Frommer Lawrence & Haug LLP; Ronald R. Santucci (57) ABSTRACT

In a method and apparatus for operating and regenerating ion exchange material a wash fluid or elution solution for rinsing the ion exchange material (1) is prepared, there is collected as a by-product of said preparation a first waste stream including cationic species to be eliminated, the ion exchange material (1) is subjected to a wash step in which there is eluted from the ion exchange material by the wash fluid or solution an anionic species to be eliminated and a second waste stream including the anionic species to be eliminated is obtained, the first waste stream (12) and the second waste stream (14) are combined to form a precipitate SW comprising a reaction product of said cationic species and said anionic species, and the precipitate is removed. The method provides an efficient means of eliminating undesired species from a circuit containing an ion exchange material to be regenerated.

31 Claims, 5 Drawing Sheets

ns a 371 of PCT/GB2006/001002 filed on
REGENERATION OF WATER TREATMENT SUBSTRATES This application is a 371 of PCT/GB2006/001002 filed on Mar. 17, 2006, published on Sep. 21, 2006 under publication number WO 2006/097762 A2 which claims priority benefits from Great Britain Patent Application Number 0505689.0 filed Mar. 18, 2005, the disclosure of which is hereby incorporated by reference.

The present invention relates to systems for the treatment of water, especially but not exclusively systems for the treatment of drinking water. In particular, the invention relates to the regeneration of ion exchange materials used in such systems and/or to treatment and minimisation of waste streams produced during the regeneration of ion exchange materials used in such systems.

Nitrate-selective ion exchange resins are in widespread use for removal of nitrate and other anions from drinking water and from water streams used for or produced in other industrial applications. A problem with all nitrate-selective resins is that they are not entirely selective for nitrate over other anions (such as sulphate and bicarbonate) which are also present in water. Under normal operating conditions, the resin is periodically regenerated with a brine solution and effluent, comprising chloride, nitrate, sulphate and bicarbonate anions and (normally) sodium counter ion is disposed to a sewage treatment works.

British Patent specification No. 2348209A describes a method for treating the effluent to recover the regenerant for re-use in a closed loop system. In order to make the process sustainable over a high number of regeneration cycles it is necessary separately to remove bicarbonate and sulphate anions from the nitrate anions absorbed on the ion exchange resin. A certain level of sulphate and bicarbonate will however pass into the closed loop as described in the above Patent specification and that level will progressively increase until solubility limits are approached, when the entire closed loop volume will have to be removed and replaced with new solution. The removed solution is a waste volume.

A waste volume also arises from the generation of softened water (that is, water with calcium and/or magnesium ions removed) which is required for making up of the brine solutions used, as described above, to regenerate the nitrate-selective resins.

The waste streams produced by the regeneration process require appropriate disposal. The elimination or reduction in volume of waste streams potentially offers advantages in terms of reduction in the cost and complexity of equipment required to handle the waste streams and to treat them to achieve environmentally appropriate concentrations for discharge.

The invention provides a method for operating and regenerating ion exchange material, comprising preparing a wash fluid for rinsing the ion exchange material and/or for generating solutions for eluting the ion exchange material;

collecting as a by-product of said preparation a first waste stream including cationic species to be eliminated;

subjecting the ion exchange material to a wash step in which there is eluted from the ion exchange material by the wash fluid or solution an anionic species to be eliminated and obtaining a second waste stream including the anionic species to be eliminated;

combining the first waste stream and the second waste stream to form a precipitate comprising a reaction product of said cationic species and said anionic species; and removing the precipitate.

The method of invention enables waste steams to be reduced, for example, by permitting the residual liquid, following precipitate removal, to be recycled for re-use in the regeneration process instead of being discarded.

In one preferred embodiment of the invention, the ion exchange material is a selective anion ion exchange material, especially a nitrate-selective ion exchange material, which is subjected to liquid washing, preferably comprising sequential wash steps using different liquids, for example, a first elution step with a dilute brine solution and a second elution step with a concentrated brine solution. Advantageously, anionic species including the anionic species to be eliminated (e.g. sulphate) are removed in sequential wash steps, and there are formed a plurality of fractions comprising said anionic species to be eliminated, the second waste stream comprising one or more said fractions. It has been found that, surprisingly, such a method of regeneration of a nitrate-selective ion exchange material can be made to result in the generation of first and second waste streams which contain stoichiometrically balanced or approximately balanced quantities of, respectively, cationic species and anionic species to be eliminated. In an especially preferred method, the step of preparing a wash fluid for eluting the ion exchange column comprises passing water over a cation exchange material thereby obtaining softened water for use as the wash fluid. On periodic regeneration of the cation exchange material by elution with brine, there is obtained the first waste stream, containing hardness ions, especially calcium and magnesium. In the sequential removal of anions as described above by different concentrations of brine the amount of sulphate preremoved from the nitrate-selective ion exchange material is dependent upon the length of time during which elution with the dilute brine solution is carried out (and therefore the volume of dilute brine solution). For a given source of water, the quantity of hardness ions extracted from softened water is dependent on the volume of water softened. It will therefore be seen that an increase in sulphate preremoval may be balanced by an increase in hardness ion in the waste stream from the cationic exchange material. The balancing works as described below, where the step of obtaining the second waste stream includes subjecting the second elution effluent from the ion exchange material in said wash step to a treatment in which nitrate is removed. Any suitable treatment method may be used for removal of nitrate from the effluent. Illustrative of suitable treatment methods are, for example, electrolytic treatment methods or microbiological treatment methods. Preferably, the effluent is treated to remove nitrate in an electrocatalytic method. It is preferred for the electrocatalytic treatment to be carried out in an electrocatalytic cell having a cathode surface that is coated with a layer of rhodium metal, which gives good electrical efficiency. One suitable form of electrocatalytic cell and its mode of operation is described in GB 2348209A. A further suitable method of operating such a cell is described in GB 2365023A.

The anionic species to be eliminated advantageously is or includes sulphate. The cationic species to be eliminated advantageously is or includes calcium ions.

Preferably, the ion exchange material is contained in more than one vessel, for example in two, three or four vessels, and the ion exchange material in a first said vessel can be loaded to chemical equilibrium by contacting the liquid from which nitrate is to be removed with the ion exchange material in said first vessel, the liquid subsequently being contacted with the ion exchange material in a second said vessel.

The invention also provides for eliminating anionic and cationic species from waste streams produced in regeneration of an ion exchange column, comprising:

feeding to a waste treatment vessel a first waste stream including a cationic species to be eliminated, which first waste stream is the waste stream generated from a water-softening treatment;

feeding to the waste treatment vessel a second waste stream which comprises a regenerant solution including an anionic species to be eliminated that reacts with said cationic species, which anionic species has been eluted from the ion exchange column by the regenerant solution;

allowing said cationic and anionic species to react to form a precipitate; and separating and removing the precipitate.

It will be appreciated that the reaction product of the cationic and anionic species to be eliminated must have a solubility product that is low. In that way, more than 50%, for example, more than 75%, preferably more than 90% and more preferably substantially all of the cationic species and/or the anionic species, and preferably of both, can be precipitated out in the waste treatment vessel.

In a second aspect of the invention there is provided a method of regenerating an ion exchange column containing a nitrate-selective ion exchange material loaded with nitrate ions, in which the loaded ion exchange column is subjected to a regeneration cycle comprising:

passing through the column a dilute brine solution;

collecting the dilute solution effluent containing at least one anion, other than nitrate, eluted from the column;

passing through the column a second, and optionally a third, brine solution, the second, and if present the third, solution having a higher concentration than the first;

collecting the second, and optional third, solution effluent containing nitrate ions;

passing water through the column and collecting the effluent wash water; and using the effluent wash water in a further regeneration treatment.

The term "brine solution" is used herein to include solutions of sodium chloride and solutions of potassium chloride. Advantageously, the first dilute solution is a dilute sodium chloride or potassium chloride solution, for example a 0.2 to 2.0% w/v solution Advantageously, the second solution is a more concentrated solution of the same compound as the first. Advantageously, the second solution is a sodium chloride or potassium chloride solution, for example, a 6 to 15% w/v solution Preferably, there is passed through the column a third brine solution, the third brine solution having a concentration similar to the second brine solution. In a preferred arrangement, the third solution effluent, containing a lower level of nitrate ions than the second solution effluent, is collected and retained for use as the second brine solution in a subsequent (usually the next) regeneration cycle. Thus, in an especially preferred arrangement, the second brine solution comprises brine solution that has been used previously as the third brine solution in a previous regeneration cycle.

The wash water is advantageously softened water. It may instead be raw water, for example, ground water, with or without further treatment, such as ground water that has been treated for removal of nitrate. A combination of softened water and raw water may be used, applied in a mixture or sequentially. The relative proportions of softened to raw water used can be varied to suit the incident levels of hardness cations and of other ions, for example, sulphate in the raw water. Advantageously, the wash water is recycled for use as the, or for the manufacture of the, first dilute solution. Advantageously, the water wash step is carried out in two phases, comprising a first phase in which a minor proportion of the wash water to be used is passed through the column and a second phase in which a major proportion of the wash water to be used is passed down the column. That enables a chloride ion spike conventionally observed when a freshly generated column is returned to service to be reduced or substantially eliminated.

The method of the invention is in particular applicable to ion exchange material in a fixed bed, moving bed or fluidized bed, especially in a fixed bed. As will be apparent, the invention describes a novel method for treating the waste volumes arising from both an anion-removing ion exchange system and a cation-removing ion exchange system, by controlled reactions between these to minimize total waste volumes and recover solutions to recycle for further operations of the system.

Two embodiments of the invention will now be described in detail, by way of illustration, with reference to the accompanying drawings, in which:

FIG. 2b is a schematic view of a second phase in the regeneration cycle of FIG. 2a;

FIG. 2c illustrates the third phase of the regeneration cycle of FIG. 2a;

FIG. 2d illustrates the fourth phase of the regeneration cycle of FIG. 2a; and

Figure 1:
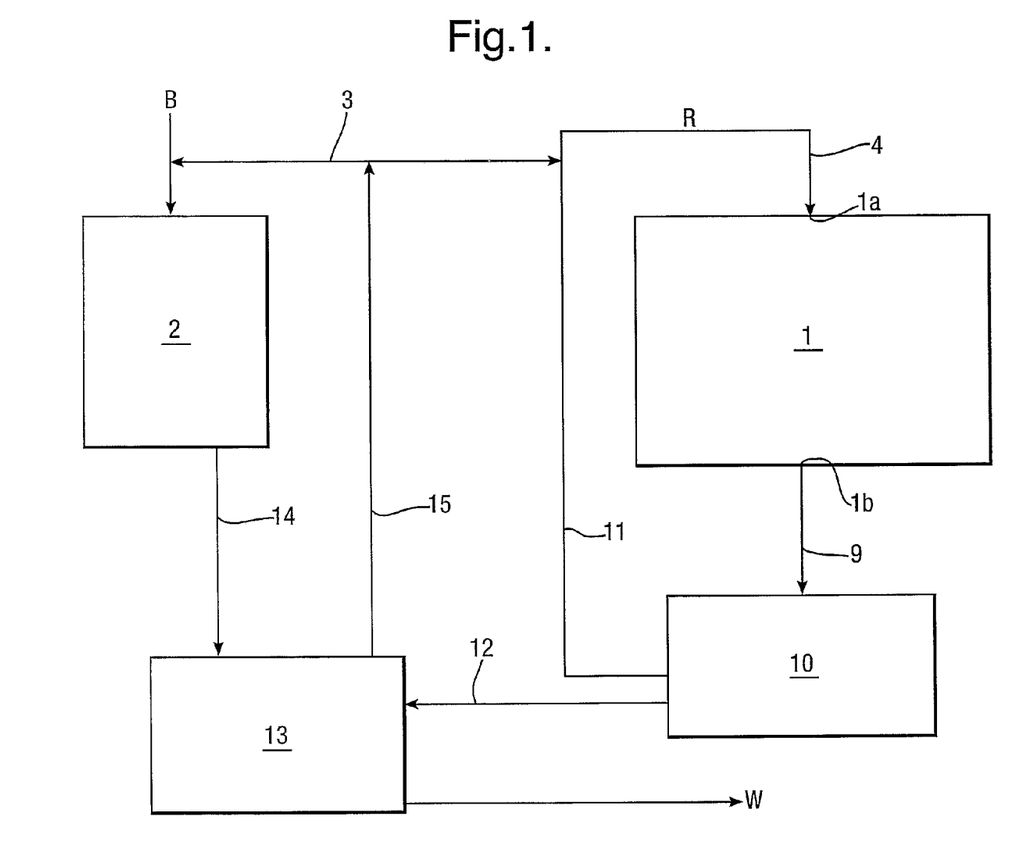
FIG. 1 is a schematic illustration of one form of process according to the invention

The regeneration loop of FIG. 1 is arranged to regenerate an anion exchange column 1, which contains an ion exchange material for removal of nitrate from a water source, for example, from a ground water source such as a bore hole. The water being treated by the ion exchange column may contain impurities other than nitrate. In order to ensure that anions other than nitrate do not adversely affect the process, the ion exchange resin is a nitrate-selective anion exchange resin that exchanges the nitrate ions in water preferentially over other anions such as sulphate and phosphate. The anion exchange resin may, for example, be a nitrate-selective resin which exchanges nitrate ions with chloride or bicarbonate ions. Examples of suitable resins are Purolite A520E supplied by Purolite International Limited and IMAC HP555, supplied by Rohm & Haas Limited.

The column 1 has an inlet 1a and an outlet 1b. During use of the column 1 in an operation mode the water to be treated, optionally after being subjected to a previous treatment, enters the column at inlet 1a and leaves the column at outlet 1b. The pathways for delivery of the water to be treated to the column 1 and transport of treated water away from the column 1 are not illustrated in FIG. 1.

Unless periodically regenerated, the ion exchange material eventually becomes saturated with nitrate. As the nitrate concentration in the ion exchange material increases, the efficacy of the nitrate removal decreases. Accordingly, to maintain a suitable level of nitrate-removing efficiency, the column needs to be subjected to a regeneration treatment at appropriate intervals.

The regeneration is carried out by washing the column 1 sequentially with regenerant liquids. Softened water for use in the regeneration operation is produced using a cation exchange vessel 2 in which water is passed over a cation exchange resin in order to effect replacement of water hardness ions, especially of calcium and magnesium ions, by sodium or potassium. The cation exchange vessel may be a standard cation exchange column as used widely to provide softened water by removing calcium and or magnesium ions. Those columns require periodic regeneration by brine solution (sodium or potassium chloride), designated as "B" in FIG. 1, with the sodium or potassium cation replacing the calcium and magnesium from the resin. The effluent from regeneration of a cation exchange column containing sodium or potassium, calcium, magnesium and chloride ions is a waste material.

The softened water so obtained is then used, after optional combination with recycled regenerant solution and concentration adjustment, where appropriate, to wash the column 1, to which it is transported via lines 3 and 4. That at least partly recycled brine stream is designated "R" in FIG. 1. One preferred sequential wash process, which is illustrated in FIGS. 2a to 2e for regeneration of one column of a water treatment system comprising three columns, is carried out in a stepwise manner as follows:

1. A very dilute brine solution made up of recycled effluent regenerant wash water from column 1 as noted in (3) below together, optionally, with added salt or additional softened water for adjustment to a salt concentration of 0.2 to 2% w/v is delivered from tank T4 as shown by arrow A1 into line 5 and via line 4 into column 1 through inlet 1a and collected from outlet 1b (see FIG. 2a). The dilute regenerant solutions remove bicarbonate and sulphate ions from the column, whilst the amount of nitrate retained on column 1 remains substantially unchanged. The effluent dilute regenerant solution is then transported along lines 6, 7 and 7a to tank T5 (sulphate tank).

Figure 2A:
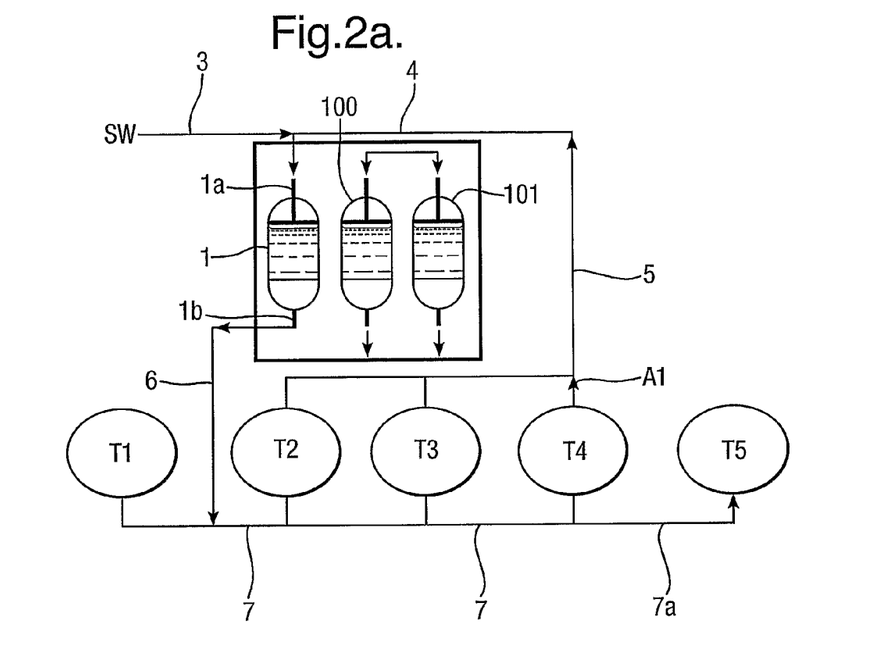
FIG. 2a illustrates a first phase of regeneration cycle for a nitrate removal column of a nitrate treatment plant having three nitrate removal columns operating in parallel.
Figure 2B:
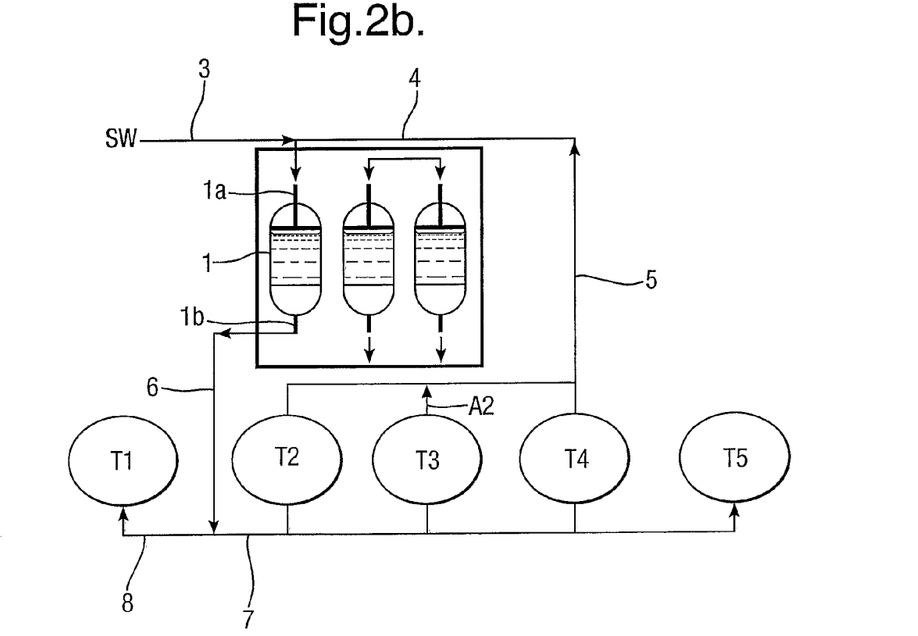
Figure 2C:
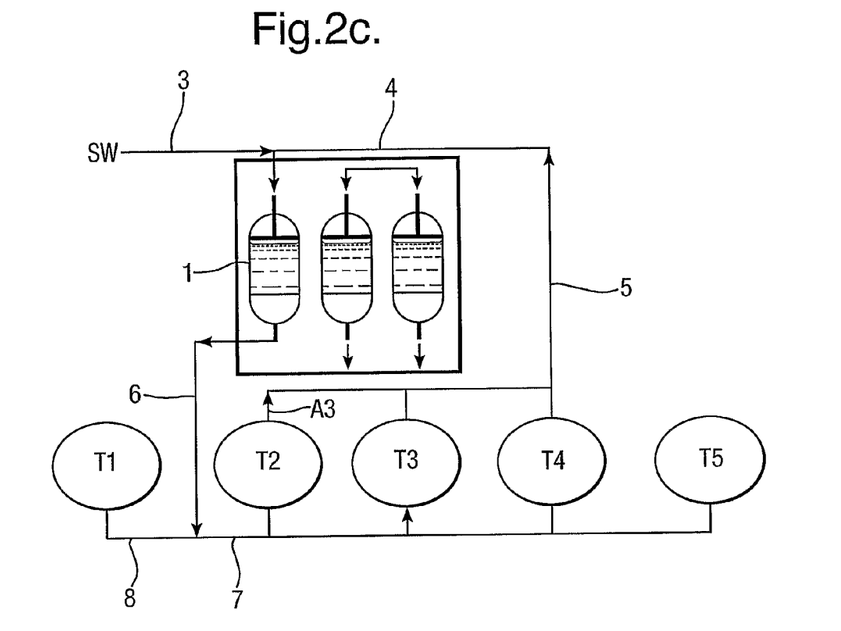
Figure 2D:
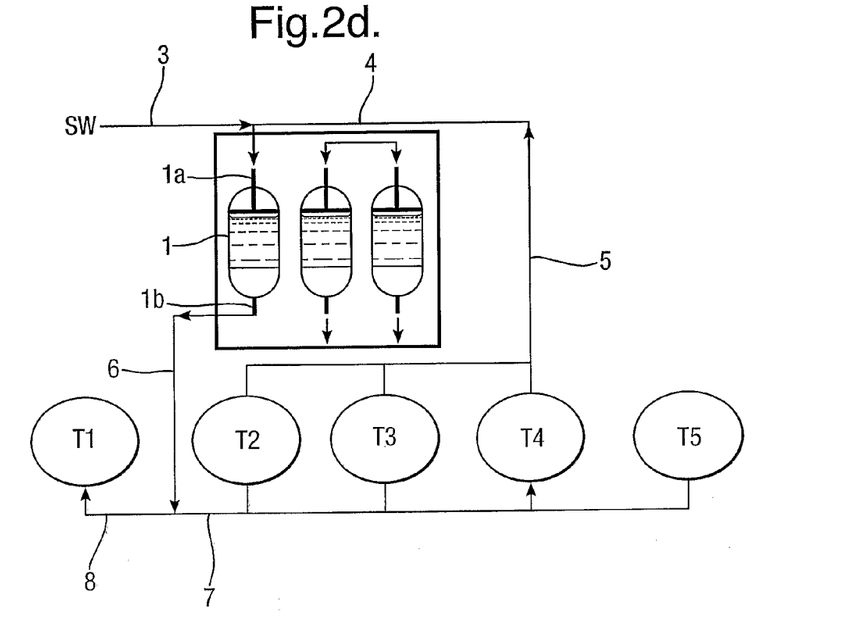

2. A more concentrated brine solution (6 to 15% w/v), comprising the effluent from a previous regeneration cycle as a result of which it contains some nitrate, is then passed from tank T3 (second nitrate tank) as shown by arrow A2 through the column 1 to remove nitrate from the column (FIG. 2b). The concentrated regenerant solution is collected at outlet 1b transported along lines 6 and 8 to tank T1 (first nitrate tank) where it is retained for subsequent treatment to remove nitrate as further described below 3. Fresh concentrated brine solution (6 to 15% w/v), either made up from softened water generated from column 2 (see FIG. 1.) and salt, or regenerated from the material treated in the cell to remove nitrate, see below, is then passed from tank T2 (fresh regenerant solution tank) as shown by arrow A3 via lines 5 and 4 and through the column 1 to remove remaining nitrate from the column (FIG. 2c). The concentrated regenerant solution is collected at outlet 1b and transported along lines 6 and 7 to tank T3 where it is retained for re-use as the first concentrated brine wash (step 2 above) in a subsequent regeneration cycle.

4. A rinse step is carried out in which a volume of softened water SW from column 2 (see FIG. 1) is passed via line 3 into inlet 1a and through column 1 (see FIG. 2d). The effluent from that rinse step contains salt rinsed from the column. It is collected at outlet 1b and transported along lines 6 and 7 to tank T4 (rinse tank) where it is retained for use as the dilute brine wash for use in step 1 of a subsequent regeneration cycle.

Figure 2E:
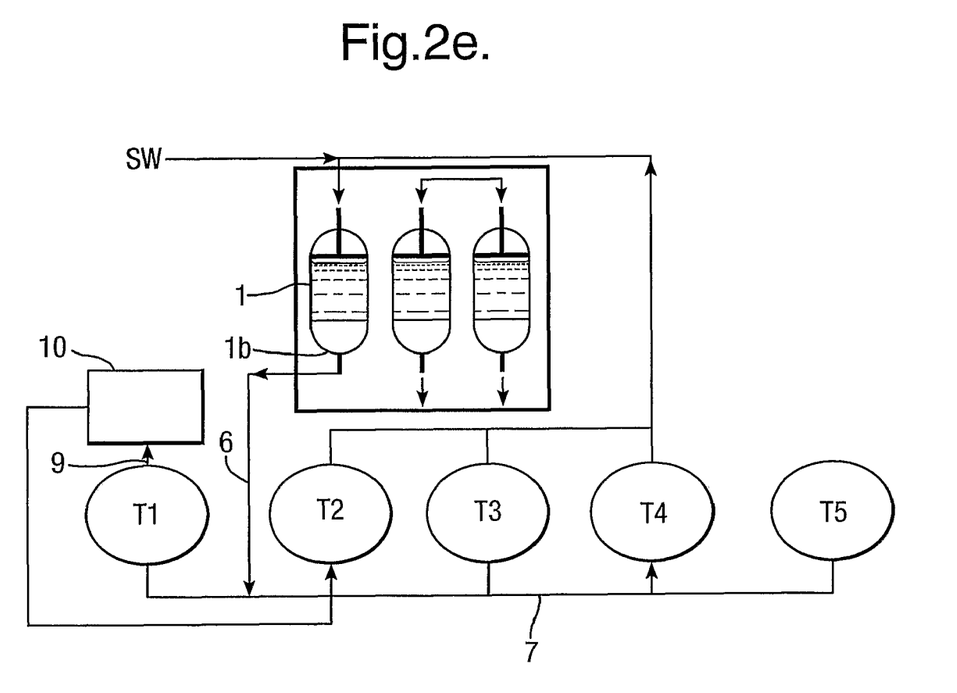
FIG. 2e illustrates the fifth phase of the regeneration cycle.

5. A second water wash step is carried out in which a second volume of softened water from column 2 is passed through column 1. The second volume of softened water is selected to be larger than the first volume of softened water referred to in 4 above. The rinse water is collected at outlet 1b and recycled to the tank T4 where it is retained with the wash water from step 4 for use as the dilute brine solution referred to in step 1 above of a subsequent regeneration cycle.

In the regeneration regime described, the anion exchange column is washed by a relatively dilute, brine solution and subsequently and sequentially by first and second volumes of concentrated brine solution. The dilute solution washes from the column primarily anions other than nitrate, in particular, sulphate and bicarbonate. The first and second volumes of more concentrated brine solution wash from the column the nitrate ions, which are replaced by chloride ions.

Optionally, the wash process may omit step 4 above. If desired, the wash water used in step 4 and/or step 5 above may be raw ground water, instead of softened water from column 2. In that case, however, the proportion of wash water used in the production of the dilute regenerant solution must be so controlled that the concentration of water hardness ions (especially calcium and magnesium) does not exceed values at which the efficacy of the dilute regenerant solution is detrimentally affected.

Referring now to FIG. 1 and FIG. 2e, the collected regenerant solution from step 2 above is transported from tank T1 (not shown in FIG. 1) via line 9 to an electrocatalytic cell 10, which may be a cell as described in GB 2348209 B having a rhodium cathode. The nitrate-containing solution is subjected to electrocatalytic treatment in cell 10 using the rhodium cathode, resulting in the electrocatalytic destruction of the nitrate ions to nitrogen gas (which is discharged at the cathode) and oxygen. The electrocatalytic cell is suitably operated at elevated temperature, i.e. at a temperature above room temperature (20° C.). For example, it may be operated at a temperature of at least 60° C., preferably in a range of from 60 to 70° C. The efficiency of the reduction of nitrate ions to nitrogen gas increases with increasing temperature. The decomposition of the nitrate ions in the electrocatalytic cell follows the formula:

$$NO_3^- \rightarrow NO_2^- + \frac{1}{2}O_2$$

$$2NO_2^- + H_2O \rightarrow 2OH^- + N_2 + \frac{3}{2}O_2$$

Thus the decomposition of the nitrate ions is balanced by the formation of hydroxide ions. The hydroxide can be eliminated by addition of an acid, for example, hydrochloric acid, regenerating chloride salt. The electrocatalytically treated solution is then recycled after correction of pH and addition of hydrochloric acid to make new regenerant solutions, as schematically illustrated by line 11 in FIGS. 1 and 2e.

The electrocatalytic treatment does not remove from the regenerant fluid sulphate ions that are present therein. As the regenerant fluids are recycled through successive wash steps, in successive regeneration cycles, the concentration of sulphate will increase until; the solubility limit is approached, when efficiency of the system reduces unless the sulphate-saturated solution is removed from the closed loop and replaced with fresh brine solution. In the regeneration cycle described above, sulphate-containing brine is automatically removed from the system for sulphate removal under predetermined conditions, for example, after a given number of wash steps, or once a given sulphate concentration is reached.

When sulphate removal treatment is to be carried out, the sulphate-containing solution is drawn off from cell 10 via line 12 and fed into a precipitation tank 13. The precipitation tank 13 also receives, via line 14, cation-containing waste stream generated by the ion exchange vessel 2. Typically, that waste stream from ion exchange vessel 2 will contain hardness cations (especially calcium). The solubility product of calcium sulphate is low ($4.9 \times 10^{-5}$), and therefore even at the concentrations of sulphate and calcium in the waste streams it is possible to obtain precipitation of most of the calcium and sulphate ions present in the precipitation tank. The precipitated solids are removed. Solids removal can be effected by any suitable technique, for example, by filtration or sedimentation. After removal of the solids, designated "W" in FIG. 1, the brine solution can be recycled via line 15 for re-use in regeneration of the cation exchange material of the cation exchange column 2 or in the regeneration cycle of the anion exchange nitrate-removal column 1. By appropriate adjustment of the feeds to the ion exchange column 1 and/or the cation exchange vessel 2, the waste streams to be combined in the precipitation tank contain the sulphate and the calcium hardness cations in substantially equimolar amounts. It is also possible to use the separated sulphate-containing solution from tank T5 by adding calcium bicarbonate, resulting in precipitation of calcium sulphate, and returning then the water with increased bicarbonate content to the potable supply. That can be advantageous to maintain the correct chloride/alkalinity ratio to minimise corrosion issues in the supply system Once the anion exchange resin has been regenerated, the ion exchange column 1 can be used again for the removal of nitrate from water containing nitrate ions. The regeneration cycle can be carried out repeatedly as and when the ion exchange resin becomes fully loaded with nitrate ions. The nitrate concentration in the treated water may be monitored continuously or non-continuously by any suitable method. In order for treatment of water to be uninterrupted, it is preferred to operate at least two anion exchange columns in parallel. That enables one of the columns to be regenerated whilst the other is in operation mode to treat water. In the embodiment of FIGS. 2a to 2e, there are three nitrate-removal columns, one of which is undergoing regeneration whilst the other two 100, 101 are in the operational phase. On completion of regeneration of column 1, that column can enter an operational phase whilst first column 100 and then column 101 are regenerated in turn. Other possible arrangements include more than three anion exchange columns, for example, four columns, in which one or two columns may be undergoing regeneration whilst the remaining columns remain in operation mode. In some cases, it may be desirable to operate two or more anion exchange columns in series as described in GB 2348209 B.

In the manner described, it is possible for the waste streams from the regeneration processes to be substantially eliminated enabling much of their volume to be recycled, resulting in a reduced requirement for discharge of waste streams from the system and for the treatment of such streams to remove unacceptable levels of environmental contaminants.

The following Example illustrates the invention:

EXAMPLE

Figure 3:
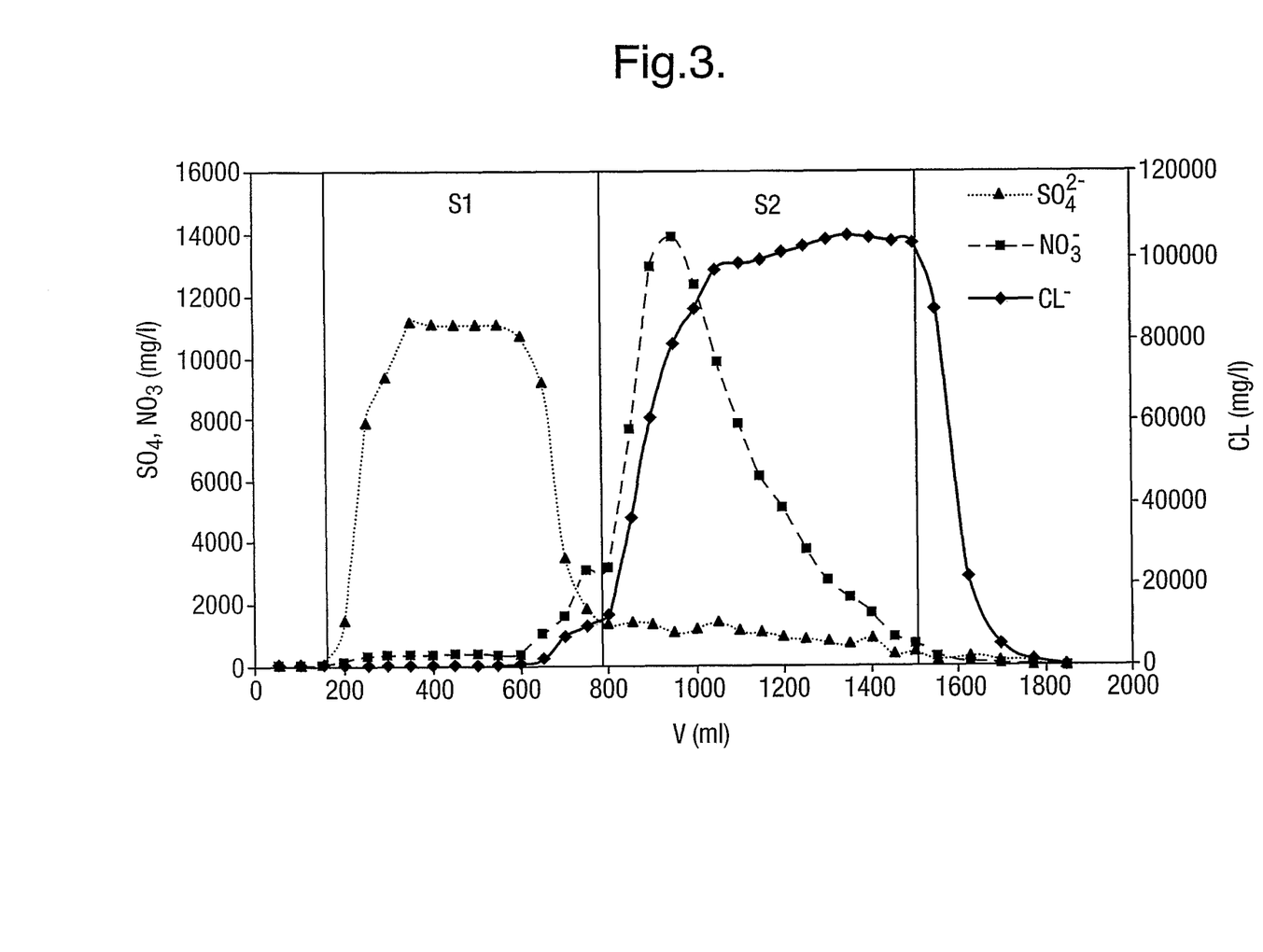
FIG. 3 is a graph tracking removal of certain anionic species during a regeneration cycle of a nitrate selective resin.

An ion exchange column containing nitrate selective resin (in this example A520E supplied by Purolite Ltd is used) loaded to chemical equilibrium with raw water containing typical levels of nitrate, sulphate, bicarbonate, calcium, magnesium and other impurities found in raw water, is regenerated using firstly a dilute solution of potassium chloride followed by a more concentrated potassium chloride solution. FIG. 3 shows the sulphate, nitrate and chloride ion concentration against the cumulative volume of regenerant V in a bed having bed volume of 283 ml. During regeneration with the dilute potassium chloride solution (FIG. 3, step 1 ("S1")), the bulk of the sulphate ions are removed from the resin. In this instance, a 2% potassium chloride solution is used. During regeneration with the concentrated potassium chloride solution (FIG. 3, step 2 ("S2")), the bulk of the nitrate ions are removed from the resin. In this instance a 15% potassium chloride solution has been used. Referring to FIG. 3, the average retained $SO_4^{2-}$ in step 1 is 7220 mg/l, whilst the average retained $SO_4^{2-}$ in step 2 is 990 mg/l.

It is apparent from FIG. 3 that not all the sulphate ions are removed in step 1 and that, where the regenerant produced in step 2 is recycled as disclosed in GB2348209A, a steady build up of sulphate will be expected in the concentrated potassium chloride solution as it is repeatedly re-used. This will require the replacement of the concentrated solution when the sulphate concentration approaches the limit of solubility (~27.5 g/l).

It is a requirement that the dilute potassium chloride solution is made up using softened water. This can be obtained by passing raw water through a small ion exchange column containing cation resin, where the calcium ions in the raw water are exchanged with potassium ions on the cation resin. This soft water can firstly be used to rinse the column containing the nitrate selective resin (FIG. 3, after step 2), which will recover the majority of the potassium chloride necessary to carry out the low concentration regeneration (Step 1). The cation resin will require periodic regeneration which can be carried out using a concentrated solution of potassium chloride, which will produce an effluent stream of calcium, and potassium chloride. The frequency of regeneration of the cation resin is directly related to the quantity of soft water produced and the calcium content of the raw water. Typically, raw water will contain 100 to 150 mg/l calcium and <5 mg/l magnesium.

It is known that the solubility of calcium sulphate is low ($4.9 \times 10^{-5}$) and therefore mixing together the concentrated solution that has been used to regenerate the nitrate selective resin with the regenerant from the cation resin will precipitate the calcium and the sulphate as calcium sulphate, which can be removed by standard filtration methods, with all the brine (potassium chloride) solution being recovered for re-use.

In practice, it is feasible to match the chemical equivalent of sulphate build up in the recycled concentrate potassium chloride solution passing through the destruction cell to the chemical equivalent of calcium removed in the generation of the required volume of soft water. Thus, when the cation column is regenerated, the used regenerant containing calcium can be mixed with the concentrated regenerant used to regenerate the nitrate selective resin with the result that the sulphate levels in the concentrate will be reduced to virtually zero. In this way, the re-use of the concentrated potassium chloride solution can be extended indefinitely and there will effectively be no liquid waste arising from the regeneration of the cation column.

Table 1 shows data relating to a regeneration regime in which 2.25 bed volumes (the volume of ion exchange resin within the column; hereafter "by") of 2% potassium chloride solution is used in step 1. The bed volume of a typical column is 1.7 m³. Therefore, regeneration of the nitrate selective resin will require about 3.83 m³ of soft water. Generation of this soft water from water containing 100 mg/l calcium will load about 382.5 g of calcium onto the cation column. This is equivalent to about 19 chemical equivalents of calcium. The corresponding increase of sulphate levels during the concentrated regeneration of the nitrate selective resin can be seen in FIG. 1, step 2 as 990 mg/l over a regenerant volume of 2.5 by. This is equivalent to about 4,210 g of sulphate (about 88 chemical equivalents of sulphate). Thus, in this regeneration regime, the quantity of sulphate build up per regeneration is significantly higher than the equivalent build up of calcium by the generation of soft water.

Table 2 shows data relating to another regeneration regime that can be carried out in the same column, with the quantity of dilute potassium chloride used in step 1 being increased. That will a) directly increase the amount of calcium removed by the cation column and b) reduce the residual sulphate levels seen in step 2. The volume and concentration of the dilute potassium chloride solution used in step 1 can therefore be tailored to match the sulphate build up in step 2, allowing minimum overall effluent production from the process. In the regime of Table 2, the volume of the dilute potassium chloride used in step 1 was increased to 5.2 by. As a result, the residual sulphate level would increase in step 2 by 500 mg/l per cycle and the calcium removed on the cation column to generate the soft water would substantially exactly match the increased sulphate level in step 2. Thus when the used regenerant from regeneration of the cation column is mixed with the concentrate regenerant from step 2, the calcium and sulphate ions will be in stoichiometric balance and will all or substantially all precipitate out as calcium sulphate, allowing the potassium chloride solution to be re-used.

Thus, the data in Table 2 demonstrates how in practice the chemical equivalent of sulphate build-up in the concentrated potassium chloride solution can be matched to the chemical equivalent of calcium removed in the generation of the required amount of soft water.

The data in the Tables relates to water from a typical single source of groundwater in the UK (site reference "LF WTW"). In the Tables, "Regen" means "regeneration", "Eq" means "equivalents" and "M Wt" means molar weight.

The sulphate removed by the dilute regenerant in step 1 can either be returned to the treated water or can be further treated by the addition of the chemical equivalent of calcium bicarbonate to precipitate out the sulphate present in this regenerant, allowing bicarbonate to be returned to the treated water. The latter is advantageous where there are concerns over the chloride ion alkalinity ratio of the treated water.

TABLE 1

Example 1 calcs with 2.5 BV KCL

Step 1
Sulphate increase in sulphate collection tank per regen

| | |
|---|---|
| Regen volume (bv) | 2.25 |
| Regen volume (m$^3$) | 3.825 |
| SO4 increase (g/m$^3$) | 7220 |
| Quantity of SO$_4$ removed per regen (g) | 27616.50 |
| M Wt SO$_4$ | 96 |
| Eq Wt SO$_4$ | 48 |
| Eq SO$_4$ removed per regen | 575.34 |

Quantity of Ca(HCO$_3$)$_2$ required to ppt SO$_4$

| | |
|---|---|
| M Wt Ca(HCO$_3$)$_2$ | 101.08 |
| Eq Wt Ca(HCO$_3$)$_2$ | 50.54 |
| Eq Ca(HCO$_3$)$_2$ required to ppt SO$_4$ | 575.34 |
| Wt Ca(HCO$_3$)$_2$ required to ppt SO$_4$ | 29077.87 |

Addtion of HCO$_3$ to product water

TABLE 1-continued

Example 1 calcs with 2.5 BV KCL

| | |
|---|---|
| Quantity of HCO$_3$ per regen (g/m$^3$) | 4587.708 |
| Quantity of HCO$_3$ per regen (g) | 17547.98 |
| Output from LF WTW (Ml/d) | 3 |
| No. regens per day LF | 4.377171 |
| Quantity of HCO$_3$ per day at LF (g) | 76810.53 |
| Increase in HCO$_3$ level in output water (mg/l) | 25.60351 |

Step 2
Volume of soft water required per regen

| | |
|---|---|
| Bed volume (m$^3$) | 1.7 |
| Rinse (bv) | 2.25 |
| KCl make-up (bv) | 0 |
| Ca level (g/m$^3$) | 100 |
| Quantity of Ca removed per regen (g) | 382.5 |
| M Wt Ca | 40.08 |
| Eq Ca removed per regen | 19.09 |

Sulphate increase in treatment tank per regen

| | |
|---|---|
| Regen volume (bv) | 2.5 |
| Regen volume (m$^3$) | 4.25 |
| SO4 increase (g/m$^3$) | 990 |
| Quantity of SO$_4$ removed per regen (g) | 4207.50 |
| M Wt SO$_4$ | 96 |
| Eq Wt SO$_4$ | 48 |
| Eq SO$_4$ removed per regen | 87.66 |
| Excess Eq SO$_4$ per regen | 68.57 |

Quantity of additional CaCl$_2$ required per regen

| | |
|---|---|
| M Wt CaCl$_2$ | 110.98 |
| Eq Wt CaCl$_2$ | 55.49 |
| Eq CaCl$_2$ required to ppt SO$_4$ | 79.27 |
| Wt CaCl$_2$ required to ppt SO$_4$ (g) | 3804.92 |

TABLE 2

Example dilute KCl increased to 5.2 BV

Step 1
Sulphate increase in sulphate collection tank per regen

| | |
|---|---|
| Regen volume (bv) | 2.25 |
| Regen volume (m$^3$) | 3.825 |
| SO4 increase (g/m$^3$) | 7220 |
| Quantity of SO$_4$ removed per regen (g) | 27616.50 |
| M Wt SO$_4$ | 96 |
| Eq Wt SO$_4$ | 48 |
| Eq SO$_4$ removed per regen | 575.34 |

Quantity of Ca(HCO$_3$)$_2$ required to ppt SO$_4$

| | |
|---|---|
| M Wt Ca(HCO$_3$)$_2$ | 101.08 |
| Eq Wt Ca(HCO$_3$)$_2$ | 50.54 |
| Eq Ca(HCO$_3$)$_2$ required to ppt SO$_4$ | 575.34 |
| Wt Ca(HCO$_3$)$_2$ required to ppt SO$_4$ | 29077.87 |

Addtion of HCO$_3$ to product water

| | |
|---|---|
| Quantity of HCO$_3$ per regen (g/m$^3$) | 4587.708 |
| Quantity of HCO$_3$ per regen (g) | 17547.98 |
| Output from LF WTW (Ml/d) | 3 |
| No. regens per day LF | 4.377171 |
| Quantity of HCO$_3$ per day at LF (g) | 76810.53 |
| Increase in HCO$_3$ level in output water (mg/l) | 25.60351 |

Step 2
Volume of soft water required per regen

| | |
|---|---|
| Bed volume (m$^3$) | 1.7 |
| Rinse (bv) | 5.22 |
| KCl make-up (bv) | 0 |
| Ca level (g/m$^3$) | 100 |
| Quantity of Ca removed per regen (g) | 887.4 |

TABLE 2-continued

Example dilute KCl increased to 5.2 BV

| | |
|---|---|
| M Wt Ca | 40.08 |
| Eq Ca removed per regen | 44.28 |

Sulphate increase in treatment tank per regen

| | |
|---|---|
| Regen volume (bv) | 2.5 |
| Regen volume ($m^3$) | 4.25 |
| SO4 increase ($g/m^3$) | 500 |
| Quantity of $SO_4$ removed per regen (g) | 2125.00 |
| M Wt $SO_4$ | 96 |
| Eq Wt $SO_4$ | 48 |
| Eq $SO_4$ removed per regen | 44.27 |
| Excess Eq $SO_4$ per regen | −0.01 |

Quantity of additional $CaCl_2$ required per regen

| | |
|---|---|
| M Wt $CaCl_2$ | 110.98 |
| Eq Wt $CaCl_2$ | 55.49 |
| Eq $CaCl_2$ required to ppt $SO_4$ | −0.01 |
| Wt $CaCl_2$ required to ppt $SO_4$ (g) | −0.59 |

The invention claimed is:

1. A method for operating and regenerating ion exchange material, comprising:
   preparing a wash fluid for rinsing the ion exchange material and/or for generating solutions for eluting the ion exchange material;
   collecting as a by-product of said preparation a first waste stream including cationic species to be eliminated;
   subjecting the ion exchange material to a wash step in which there is eluted from the ion exchange material by the wash fluid or solution an anionic species to be eliminated and obtaining a second waste stream including the anionic species to be eliminated;
   combining the first waste stream and the second waste stream to form a precipitate comprising a reaction product of said cationic species and said anionic species; and removing the precipitate.

2. A method according to claim 1, in which the step of obtaining the second waste stream includes subjecting the effluent from the ion exchange material to a treatment in which nitrate is removed.

3. A method according to claim 2, in which the nitrate-removal treatment comprises an electrolytic treatment methods.

4. A method according to claim 2, in which the nitrate-removal treatment comprises treatment in an electrocatalytic cell.

5. A method according to claim 2, in which the nitrate-removal treatment comprises a microbiological treatment method.

6. A method according to claim 1, in which the ion exchange material is a selective anion ion exchange material.

7. A method according to claim 6, in which the ion exchange material is a nitrate-selective ion exchange material.

8. A method according to claim 1, in which the wash fluid is softened water and is prepared by exposing water to cation exchange material.

9. A method according to claim 1, in which the anion ion exchange material is subjected to a plurality of wash steps.

10. A method according to claim 9, in which anionic species including the anionic species to be eliminated are removed in sequential wash steps, and there are formed a plurality of fractions comprising said anionic species to be eliminated, the second waste stream comprising one or more said fractions.

11. A method according to claim 1, in which the anionic species to be eliminated is sulphate.

12. A method according to claim 1, in which the precipitated reaction product comprises calcium sulphate.

13. A method according to claim 1, in which the step of preparing a wash fluid and the step of eluting the ion exchange material by the wash fluid can be so arranged that the quantity of cationic species to be eliminated is substantially matched to the quantity of anionic species to be eliminated.

14. A method according to claim 13, in which said matching can be effected by adaptation of the volume of wash fluid used in the elution step.

15. A method according to claim 1, in which the ion exchange material is contained in more than one vessel, and in which the ion exchange material in a first said vessel can be loaded to chemical equilibrium by contacting the liquid from which nitrate is to be removed with the ion exchange material in said first vessel, the liquid subsequently being contacted with the ion exchange material in a second said vessel.

16. A method for eliminating anionic and cationic species from waste streams produced in regeneration of an ion exchange column, comprising:
   feeding to a waste treatment vessel a first waste stream including a cationic species to be eliminated, which first waste stream is the waste stream generated from a water-softening treatment;
   feeding to the waste treatment vessel a second waste stream which comprises a regenerant solution including an anionic species to be eliminated that reacts with said cationic species, which anionic species has been eluted from the ion exchange column by the regenerant solution;
   allowing said cationic and anionic species to react to form a precipitate; and
   separating and removing the precipitate.

17. A method of regenerating an ion exchange column containing a nitrate-selective ion exchange material loaded with nitrate ions, in which the loaded ion exchange column is subjected to a regeneration sequence comprising:
   passing through the column a dilute brine solution;
   collecting the solution effluent containing at least one anion other than nitrate;
   passing through the column a second, and optionally a third, brine solution, the second, and if present the third, solution having a higher concentration than the first; and
   collecting the second, and optional third, solution effluent containing nitrate ions,
   passing water through the column and collecting the effluent wash water; and
   using the effluent wash water in a further regeneration cycle.

18. A method according to claim 17, in which there is passed through the column a third brine solution of similar concentration to the second brine solution.

19. A method according to claim 18, in which the third solution effluent, containing a lower level of nitrate ions than the second brine solution effluent, is collected and retained for use as the second brine solution in a subsequent regeneration cycle.

20. A method according to claim 17, in which the nitrate concentrate from the second elution is passed into a nitrate destruction apparatus and the brine solution thereby regenerated for a subsequent regeneration step.

21. A method according to 17, in which the dilute brine solution is a dilute sodium chloride or potassium chloride solution.

22. A method according to claim 17, in which the dilute brine solution is a 0.2 to 2.0% w/v solution of sodium chloride or potassium chloride.

23. A method according to claim 17, in which the brine solution is a more concentrated solution of the same compound as the first.

24. A method according to claim 17, in which the second brine solution is a sodium chloride or potassium chloride solution.

25. A method according to claim 17, in which the second brine solution is a 6 to 15% w/v solution of sodium chloride or potassium chloride.

26. A method according to claim 17, in which the third brine solution is a 6 to 15% w/v solution of sodium chloride or potassium chloride.

27. A method according to claim 17, in which the wash water is softened water.

28. A method according to claim 17, in which the wash water comprises softened water and raw water.

29. A method according to claim 17, in which the wash water is recycled for use as a, or for manufacture of a, regenerant solution.

30. A method according to claim 17, in which the water wash step is carried out in two phases, comprising a first phase in which a minor proportion of the wash water to be used is passed through the column and a second phase in which a major proportion of the wash water to be used is passed down the column.

31. A method according to claim 17, in which the anions are removed from said solution effluent by a process in which the solution effluent is combined with a waste stream containing cationic species to be eliminated, said waste stream being a by-product of preparing a wash fluid for rinsing the ion exchange material and/or for generating solutions for eluting the ion exchange material, said process involving forming a precipitate comprising a reaction product of said cationic species and said anionic species and removing the precipitate.

\* \* \* \* \*